United States Patent
De Bont et al.

(10) Patent No.: US 7,054,380 B2
(45) Date of Patent: May 30, 2006

(54) EMBEDDING A FIRST DIGITAL INFORMATION SIGNAL INTO A SECOND DIGITAL INFORMATION SIGNAL FOR TRANSMISSION VIA A TRANSMISSION MEDIUM

(75) Inventors: Franciscus Marinus Jozephus De Bont, Eindhoven (NL); Leon Maria Van De Kerkhof, Eindhoven (NL); Arnoldus Werner Johannes Oomen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 844 days.

(21) Appl. No.: 09/913,809

(22) PCT Filed: Dec. 19, 2000

(86) PCT No.: PCT/EP00/12988

§ 371 (c)(1),
(2), (4) Date: Aug. 17, 2001

(87) PCT Pub. No.: WO01/46954

PCT Pub. Date: Jun. 28, 2001

(65) Prior Publication Data

US 2002/0181606 A1    Dec. 5, 2002

(30) Foreign Application Priority Data

Dec. 21, 1999    (EP) .................................. 99204455

(51) Int. Cl.
H04L 27/04    (2006.01)

(52) U.S. Cl. ...................... 375/295; 375/242; 348/521; 386/84; 360/24

(58) Field of Classification Search ................ 375/295, 375/242; 348/521, 525; 386/84; 360/24
See application file for complete search history.

(56) References Cited

U.S. PATENT DOCUMENTS

| | | | |
|---|---|---|---|
| 4,001,883 A * | 1/1977 | Strout et al. ................... 360/48 |
| 4,072,987 A * | 2/1978 | Walker ......................... 360/48 |
| 5,210,738 A | 5/1993 | Iwata et al. ............... 369/275.1 |
| 5,649,054 A * | 7/1997 | Oomen et al. .............. 704/229 |
| 5,724,327 A | 3/1998 | Timmermans et al. ........ 369/48 |
| 6,157,330 A * | 12/2000 | Bruekers et al. ............. 341/143 |
| 6,792,542 B1 * | 9/2004 | Lee et al. .................... 713/200 |

FOREIGN PATENT DOCUMENTS

WO    WO 01/06509    *    1/2001

* cited by examiner

Primary Examiner—Temesghen Ghebretinsae
(74) Attorney, Agent, or Firm—Michael E. Belk

(57) ABSTRACT

A transmitter is disclosed for transmitting a first and second digital information signal. Said first digital information signal comprises first frames having at least a first synchronization signal and a data portion stored in them. The transmitter processes the second digital information signal into subsequent second frames comprising blocks of information of the second digital information signal. Composite frames have been obtained by inserting a second synchronization signal and at least the data portion of the first frames into the second frames by using buried data techniques. Prior to inserting at least the data portion of the first frame into a second frame the first synchronization signal is stripped from the first frame. The sequence of composite frames is transmitted via the transmission medium.

22 Claims, 5 Drawing Sheets

Figure 1:
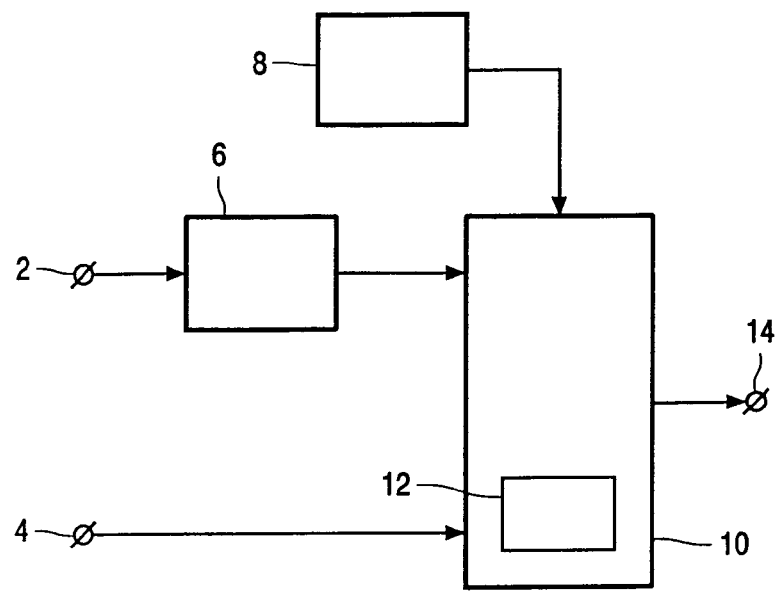

EMBEDDING A FIRST DIGITAL INFORMATION SIGNAL INTO A SECOND DIGITAL INFORMATION SIGNAL FOR TRANSMISSION VIA A TRANSMISSION MEDIUM

The invention relates to a transmitter for transmitting a first and second digital information signal via a transmission medium, said first digital information signal comprising first frames having at least a first synchronization signal and a data portion stored in them, the transmitter comprising:

input means for receiving the first and second digital information signal;

processing means for processing the second digital information signal into subsequent second frames, said second frames comprising blocks of information of the second digital information signal;

signal combination means for inserting a second synchronisation signal and at least the data portion of a first frame into a second frame of the second digital information signal so as to obtain a composite frame;

output means for supplying the composite frames to an output terminal so as to obtain a composite signal to be transmitted.

The invention further relates to a receiver for receiving a composite signal from a transmission medium and generating a first and a second digital information signal, to a record carrier obtained with the transmitter, when in the form of an apparatus for recording information on a record carrier, and to a transmission method.

Transmitters and receivers defined above are commonly known in the form of transmitters for transmitting an MPEG encode signal. Transmission systems usually use multiple layers. Synchronisation becomes possible only by the use of sync patterns in these layers. However, these sync patterns in a system having multiple sync patterns reduces the transmission efficiency. For example in DVD-Video sync patterns are used in both the system stream layers as well as in the elementary stream layers. Only the sync pattern in the highest system layer is used for synchronisation on the system stream. The sync patterns in the elementary streams are used for synchronization during decoding of said elementary stream. Further, DAB uses sync patterns in both the system stream layer as well as in the elementary stream layer. However a decoder uses only one of both.

The invention aims at providing transmitters and receiver having an more efficient method of transmitting and receiving a first and a second digital information signal, whereby said first digital information signal comprises first frames having at least a second synchronization portion.

The transmitter in accordance with the invention is characterized in that signal combination means are adapted to strip the first synchronization signal from said first frames prior to inserting at least the data portion of the first frames into the second frames.

The receiver in accordance with the invention is characterized in that the receiver further comprises;

synchronization signal generator means for generating a first synchronization signal;

signal combination means for combining the first synchronization signal and the at least the data portion of the first digital information signal so as to obtain a first frame of the first digital information signal;

second output means for subsequently supplying the first frames of the first digital information signal to a first output terminal so as to obtain the first digital information signal.

The invention is based on the following recognition. In for example a buried data channel in a PCM signal any other information signal may be stored. To be able to retrieve the information signal from said buried data channel the buried data channel comprises frames whereby each frame has a synchronization signal. After detecting said synchronization signal, a frame from the buried data channel can be retrieved from the PCM signal. If the information signal stored in the buried data channel is an encoded signal comprising a sequence of frames each having a synchronization signal, for example an MPEG encode signal, said synchronization signal has to be retrieved in a receiver to be able to decode said sequence of frames. However, if each frame in the buried data channel comprises only one frame of the encoded signal, said synchronization signal in a frame of the encoded signal needs not to be transmitted, there said synchronization signal can be generated in the receiver each time a frame in the buried data channel is retrieved. Thus in a transmitter, prior to inserting a frame of the encoded signal into the buried data channel the synchronization signal is striped from said frame. In a receiver the synchronization signal is generated and combined with the data retreived from a frame of the buried data channel so as to obtain a frame of the encoded signal. By doing this the data capacity needed to transmit an additional signal comprising a sequence of frames is reduced. This reduction may be used to use less capacity in the PCM signal for the buried data channel, resulting in a higher quality PCM signal. On the other hand, the extra data capacity in the buried data channel, obtained by removing the synchronization signal may be used for transmitting a less compressed data signal being normally a better representation of the data signal.

Figure 2:
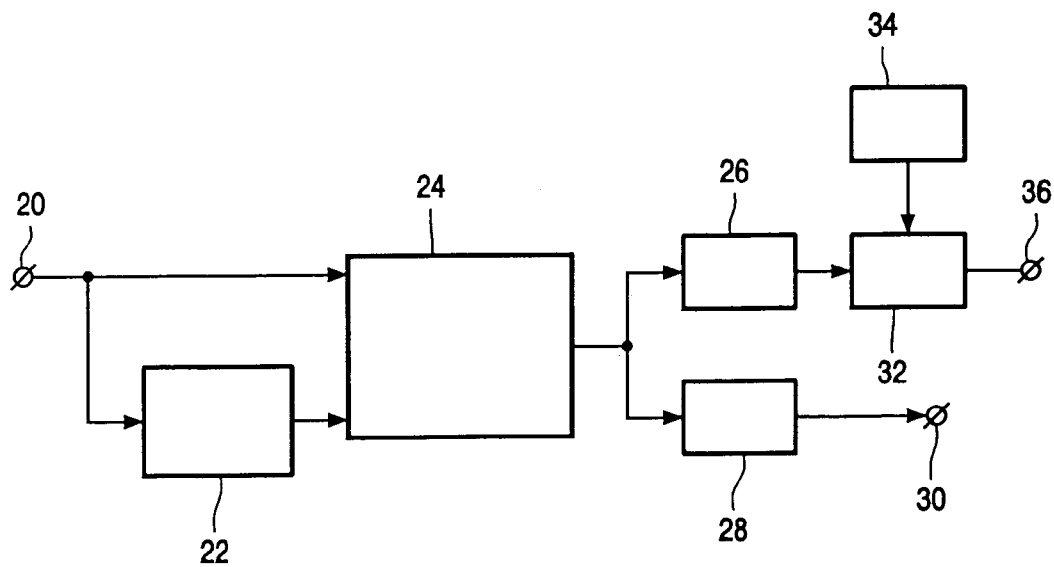
Figure 3:
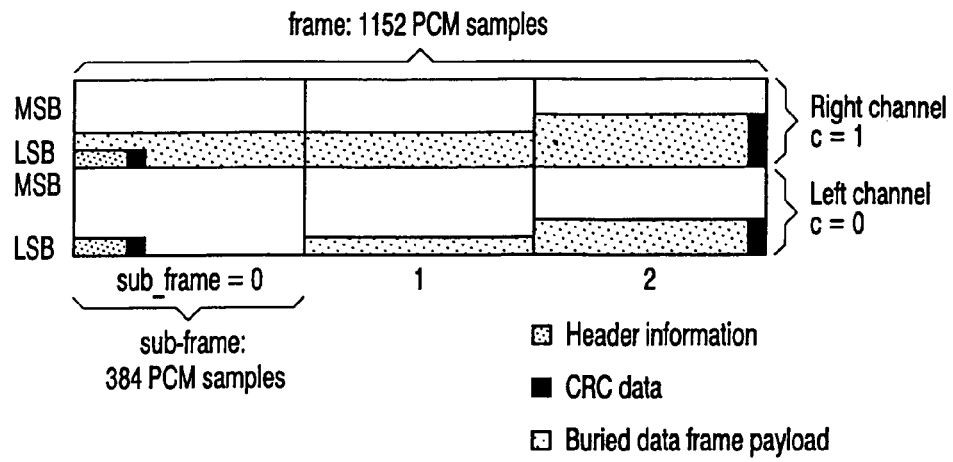
Figure 4:
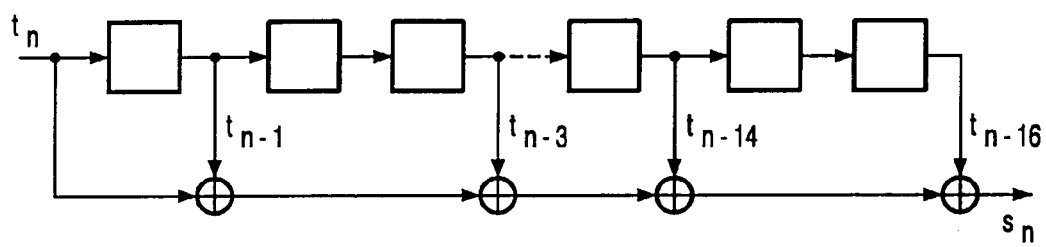
Figure 5:
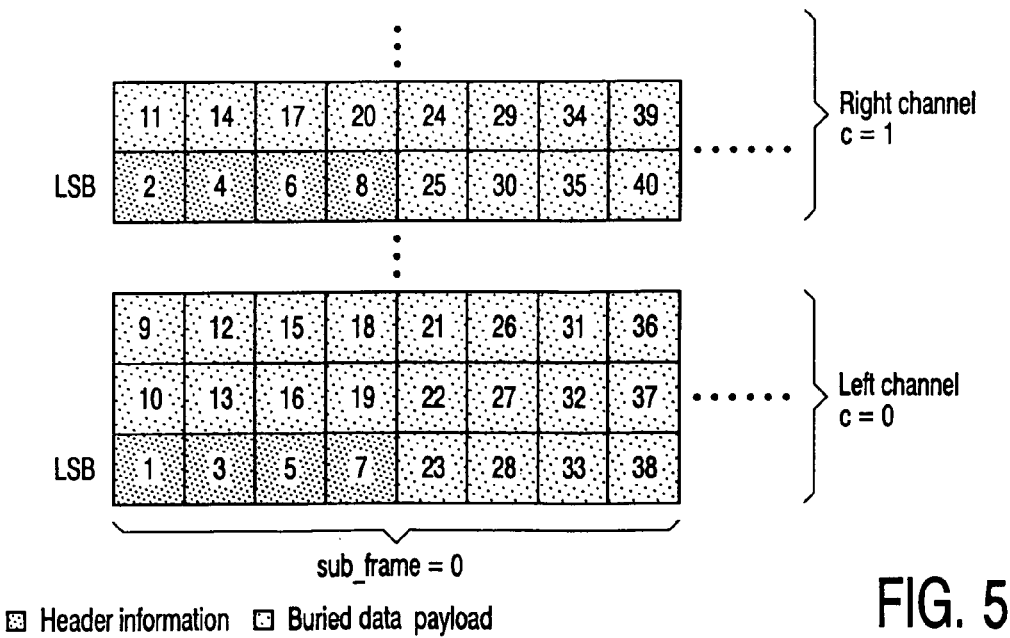
Figure 6:
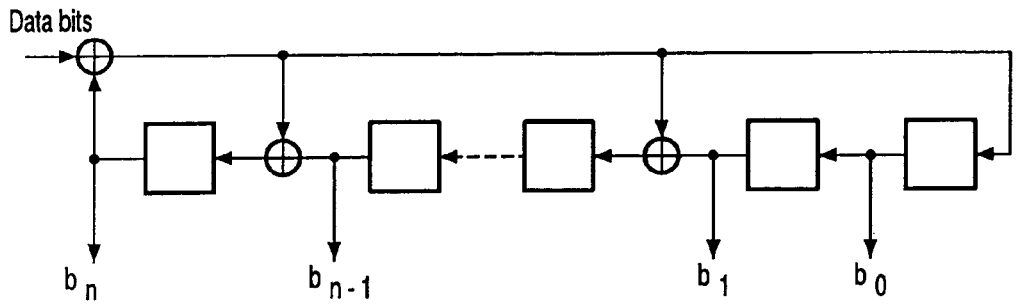
Figure 7:
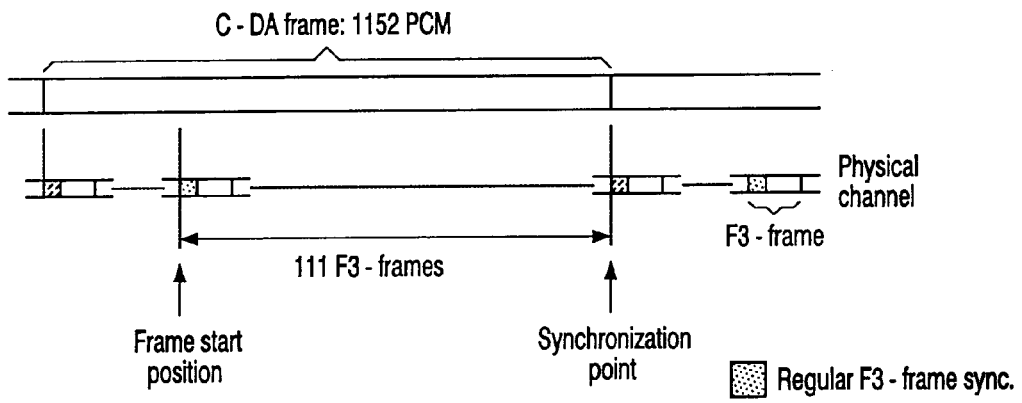
Figure 8:
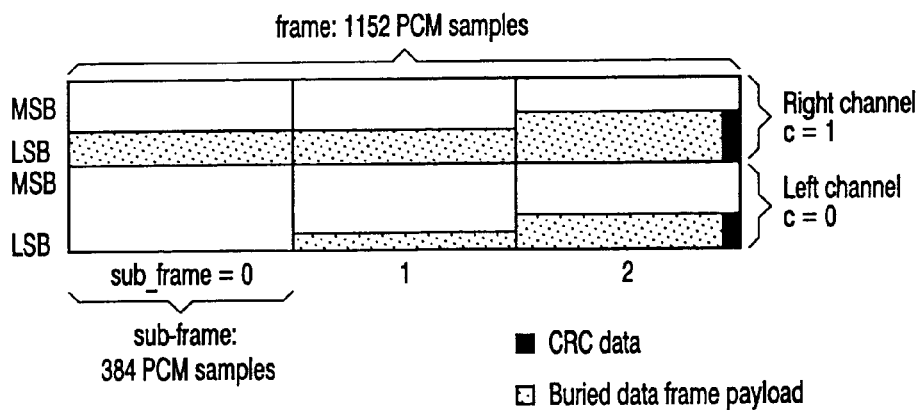
Figure 9:
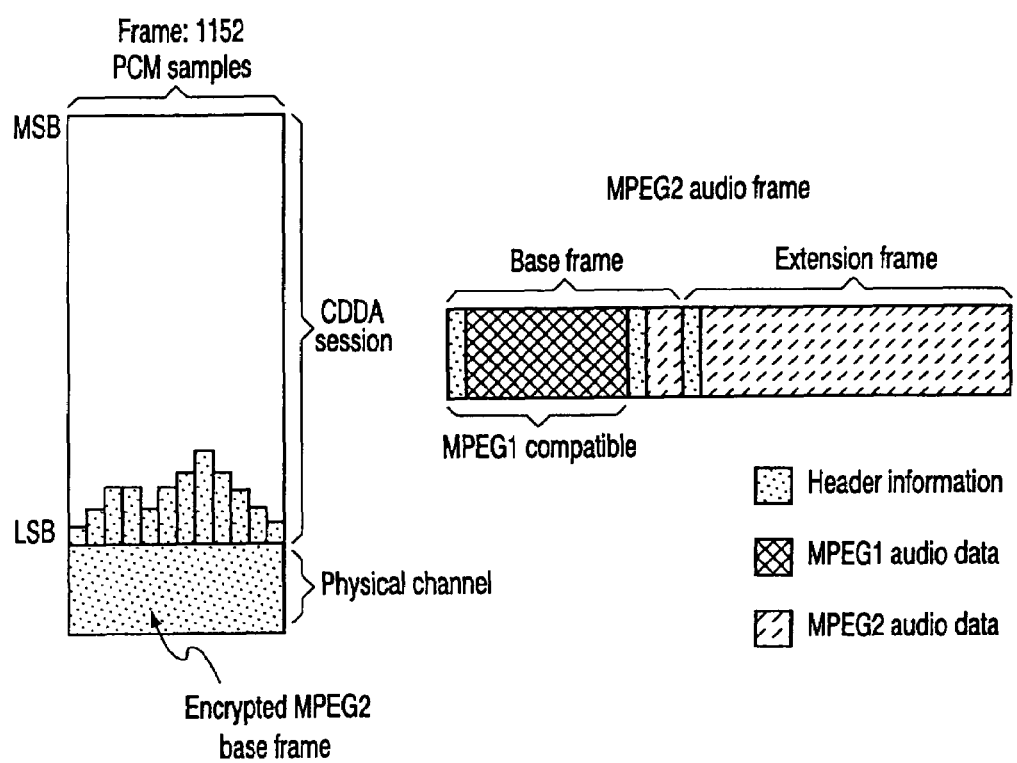

These and other objects of the invention will become apparent from and elucidated further with reference to the embodiments described in the following figure description in which FIG. 1 shows an embodiment of a transmitter in accordance to the invention, FIG. 2 shows an embodiment of a receiver in accordance to the invention, FIG. 3 shows a Buried data frame-structure with header, FIG. 4 shows the de-randomization circuit, FIG. 5: shows The bits in the buried_data_frame need to be inserted into the de-randomization circuit in a specific order, FIG. 6 shows a CRC-check diagram, FIG. 7 shows A frame of 1152 stereo PCM samples corresponds to 192 F3 frames, FIG. 8 shows a Buried data frame structure without header, FIG. 9 shows the distribution of Encrypted MPEG2 audio data the buried data channel and the physical channel.

Figure 10:
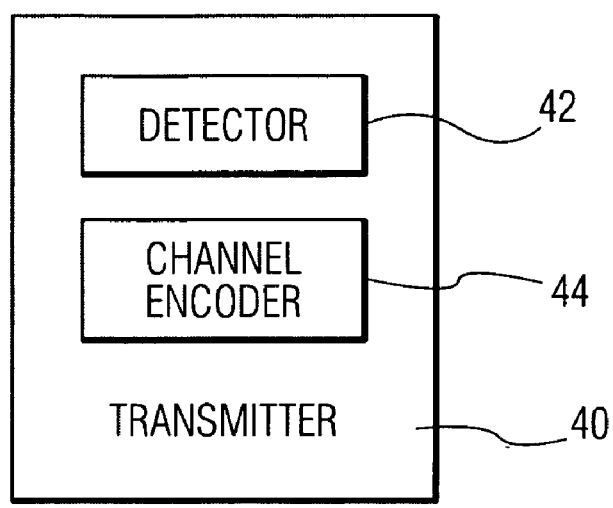

FIG. 10 shows another specific embodiment of a transmitter in accordance to the invention.

FIG. 1 shows an embodiment of a transmitter in accordance to the invention. The transmitter has a first input terminal 4 for receiving a first digital information signal. Said first digital information signal comprises first frames. The first frames comprise at least a first synchronization signal and a data portion. The first digital information signal could be an MPEG encoded signal. The transmitter has a second input terminal 2 for receiving a second digital information signal. The second digital information signal is for example a normal CDDA signal (Compact Disc Digital Audio). The second digital information is supplied to a processing unit 6. The processing unit 6 divides the second digital information signal into subsequent blocks of information. From the subsequent blocks of information the processing unit 6 generates subsequent second frames. In a preferred embodiment the second digital information signal is a normal CDDA signal having PCM samples. Preferably, a second frame comprises 1152 PCM samples. Each frame is consists of 3 PCM sub frames, each having 384 PCM samples. It should be noted that the number 9 PCM subframes, each having 128 PCM samples, is suitable as well.

The transmitter further comprises a sync generator unit 8 for generating a second synchronization signal. The second synchronization signal is supplied to a signal combination unit 10. The combination unit 10 makes preferably use of buried date techniques to determine a buried data channel in the PCM samples of a second frame. By using buried data techniques the perceived SIN ratio of the transmitted PCM signal, which comprises a buried data channel in the least significant bits of the PCM samples, is approximately the same as the SIN ratio of the original PCM signal. The combination unit 10 inserts the second synchronization signal in the buried data channel. Preferably, the synchronization signal is inserted in the second frame such that the frame starts with a sync pattern in the two least significant bits of its first 6 L+R PCM samples. The data to be stored in the buried data channel is preferably inserted in the PCM L and R channel on a sample by sample interleaving basis. FIG. 3 shows an embodiment of a second frame. Each second frame starts with header information. The header information of each frame comprises the synchronization signal, the bit allocation of the 3 sub-frames defining the PCM bits belonging to the buried data channel. Furthermore, the buried data frame payload is an example of the least significant bits LSB of the L+R PCM samples, which are determined by buried data techniques to be used to carry data bits of the buried data channel. FIG. 5 shows an example how the bits in the buried data frame could inserted. Firstly, the header is alternately stored in the LSB's of the first 4 Left and Right PCM samples of the first sub-frame. Next, the data bits are alternately inserted in the allocated buried data payload. In FIG. 5 the 3 LSB's of the PCM samples of the Left channel and the 2 LSB's of the Right channel are allocated to store data. The number in the squares indicates the sequence in which the bits are stored in the buried data payload.

The signal combination unit 10 is arranged to insert at least the data of a first frame into the buried data frame payload. Firstly, the first synchronization signal is stripped from the first frame by unit 12. Further, prior to writing the data portion of the first frames in the buried data frame payload the data portion of the first frame is randomized. By randomizing a burst of errors in the buried data frame payload will not result immediately to uncorrectable errors in the data of the buried data channel. At last, the signal combination unit 10 is arranged to store in the last 16 bits of the buried data frame payload a CRC-16 word for error detection purposes. Therefore, the data bits inserted in the buried data channel are fed through a LFSR (Linear Feedback Shift Register) with for example polynomial 0×8005. The final state of the LFSR is stored in the buried data CRC-16 word. The thus obtained composite frame is supplied to an output terminal. In the event that there is no capacity in the PCM samples for a buried data channel, only the header information is inserted in a second frame.

The functioning of the transmitter is as follows. The PCM frame consists of 3 subframes each having 384 PCM samples. The 1152 PCM samples in a PCM frame represents a time length which matches exactly the MPEG-2 Audio Layer II frame length. In IEC-61937 formatting the first 16 bits of an MPEG Audio frame are unique for the CD Surround application (0×FFFC, 12 bit sync+ID=mpeg-1+Layer-II+protection=used). As the time length of a PCM frame is equal to the time length of an MPEG frame, the first 16 bits of an MPEG frame need not transmitted. In a receiver said 16 bits have to be placed before the extracted and decoded buried data. Furthermore, a preamble consisting of two sync words, an identification word and a payload length word has to placed before the MPEG Audio frame and finally the IEC frame has to be padded with zeros. The transmitter receives the CDDA PCM samples and generates subsequent frames each having 1152 PCM samples. The available capacity for a buried data channel is determined. Further the transmitter receives the MPEG audio frame and strips the first bits from said frame. The remaining bits of said frame are randomized and a CRC word is determined for the remaining bits. To obtain the composite signal firstly, the header information is inserted in the LSB of the first PCM samples in a frame. Secondly, the randomized bits are inserted in the buried data channel payload. Finally the CRC word is inserted in the last 16 bits of the buried data frame payload. The thus obtained composite signal is transmitted via a transmission medium.

The buried data channel is preferably used to transmit extra audio content within the 16-bit audio PCM data on a normal Audio CD. This extra audio content is preferably compressed according to the MPEG Audio standard. As the first 16 bits of a MPEG Audio Frame are unique for the CD surround application they are not transmitted. In a CD surround decoding apparatus comprising an receiver which will be described below, these 16 bits are placed in front of the bits extracted from the buried data channel stored in the PCM data.

FIG. 2 shows an embodiment of a receiver for receiving a composite signal and generating a first and second digital information signal therefrom. The composite signal comprises composite frames. A composite frame has a second synchronization signal The receiver has an input terminal 20 for receiving the composite signal. The composite signal is supplied to an detection unit 22 and unit 24. The detection unit 22 is arranged for detecting a second synchronization signal and generating a detection signal in response to a detected second synchronization signal. The detection signal is supplied to a control input of unit 24. Unit 24 is arranged for retrieving a composite frame from the composite signal in response to the detection signal. The composite frames are supplied to a first extraction unit 26 and a second extraction unit 28. The first extraction unit 26 is arranged for extracting at least a data portion of a first frame of the first digital information signal from a composite frame. The data portion of a first frame is supplied to signal combination unit 32. The second extracting unit 28 is arranged for extracting at least a part of the second digital information signal from a composite frame so as to obtain a second frame of the second digital information signal. The subsequent second frames, which form the second digital information signal, are supplied to output terminal 30.

The receiver further comprises a synchronization signal generator unit 34. The synchronization signal generator unit 34 is arranged for generating a first synchronization signal. The first synchronization signal is supplied to the signal combination unit 32. The signal combination unit 32 is arranged for combining the first synchronization signal and at least the data portion of a first frame so as to obtain the first frame of the first digital information signal. The subsequent first frames are supplied to output terminal 36. The subsequent first frames form the first digital information signal.

The receiver described above functions as follows. The composite signal is received at the input terminal 20. A transmitter as described above generates the composite signal. The composite signal is a CDDA signal having left and right PCM samples. The CDDA signal comprises frames as disclosed in FIG. 3. The CDDA signal comprises a buried data channel. To be able to retrieve the buried data from the CDDA signal each frame comprises header information. The header information comprises a second synchronization signal. The second synchronization signal is in this embodiment in the two least significant bits of the first 6 L+R PCM samples of each frame. However, other ways to insert the second synchronization signal are possible, for example in the least significant bit of the first 12 L+R PCM samples. The synchronization signal detection unit 22 detects the second synchronization signal and generates a detection signal in response thereto. Unit 24 retrieves under control of the detection signal the composite frames from the CDDA signal. An embodiment of a frame is disclosed in FIG. 3. The second extraction unit 28 receives the second frames to generate the second digital information signal. As in this embodiment a buried data channel is used there is no need to extract the unmodified bits of the original signal from the PCM samples of the second frame. In the event the n LSB's of each PCM sample are used to carry the first digital information signal, these bits will introduce audible noise. To reduce the audible noise the MSB's of the PCM samples have to be extracted from the second frames.

The synchronization signal generator unit 34 generates a first synchronization signal. In the event the first digital information signal is an MPEG-2 Audio Layer II signal, the first 16 bits of each frame are unique for the CD Surround application (0xFFFC, 12 bit sync+ID=mpeg-1+Layer-II+protection=used). Furtheremore a preamble consisting of two sync words, an identification word. The first synchronization signal comprises at least this information. The first extraction unit 26 extracts the header information from the second frames. The header information comprises next to the sync signal information the bit allocation of the subframes. The bit allocation defines the bits of the PCM samples belonging to the buried data channel, thus the buried data frame payload. Next, unit 26 extracts the buried data from the second frames. Preferably, the buried data bits are randomized written in the buried data channel. FIG. 4 shows an embodiment to de-randomize the buried data bits. The circuit comprises an array of delays and exclusive OR's. The delays perform a one bit delay function. The reference $t_n$ represents inputted buried data bit n and $S_n$ represents outputted de-randomized bit n. The circuit disclosed in FIG. 4 performs the following operation: out=z[16]^z[14]^z[3]^z[1]^z[0], logical exclusive-or operator and z[n] is the bit extracted n bits back. At the start of a new frame the state z has to be initialized with all one's. The de-randomized data of a frame is supplied to combination unit 32. The first extraction unit preferably comprises a CRC checking circuit. A diagram of said circuit is disclosed in FIG. 6. The last 16 bits of the buried data contain a CRC-16 word for error detection purposes. Each de-randomized buried data bit, except for the last 16, is fed through a LFSR (Linear Feedback Shift Register) with polynomial 0x8005, as disclosed in FIG. 6. The final state of the LFSR has to be compared with the buried data CRC-16 word. If these two words are not the same, a transmission error has occurred.

Combination unit 32 receives the de-randomized data and calculates the payload of the de-randomized data in a first from an MPEG-Audio frame of the first digital signal. The combination unit 32 combines the first synchronization signal generated by unit 34 and the calculated payload so as to obtain the preamble of an MPEG Audio frame. The de-randomized data is place after the pre-amble. In the event the bit length of the preamble and the de-randomized data is not in accordance to the length of a MPEG Audio frame, the frame has to be padded with zero's, so as to obtain the correct frame length. The thus obtained frames are supplied to output terminal 36 to provide the first digital information signal at the output of the receiver.

As described above, the first six PCM samples of a PCM frame contain the first 24 bits of a burried data frame, being a sync pattern. These 24 bits preferably contain the code: 0xF87E1F(1111 1000 0111 1110 0001 1111).

It can be notes that the number of bits in a buried data frame be always a multiple of eight, the de-randomization can be done very efficiently per eight bits. Also the CRC-16 calculation can make use of this fact. Further, in the described format two bits are reserved in the buried header. These bits may be use for a possible future extension with a physical channel and/or copy protection mode.

In accordance with the invention only one sync pattern is transmitted and the other sync and unique patterns of the MPEG Audio frames are regenerated in the receiver.

The extraction of the buried data payload contained in uniquely decode-able buried data frames of 1152 stereo PCM samples performed by receiver will be described now in more detail. A buried data frame is subdivided into three buried data subframes of 384 samples each. Each subframe for each channel has an individual allocation which is denoted by alloc[ch][sub frame]. For the corresponding channel "ch" and subframe "sub_frame", this allocation indicates the number of LSB's of the PCM sample that is used to carry the buried data frame. The header information is always contained in the LSB of the PCM samples. The applied frame structure is depicted in FIG. 1. In this example the allocation of the buried data subframes is as given in table 1.

TABLE 1

| subframe allocation. | | |
|---|---|---|
| alloc[ch][subframe] | | ch |
| subframe | 0 | 1 |
| 0 | 0 | 2 |
| 1 | 1 | 2 |
| 2 | 2 | 3 |

In order to extract the correct number of LSB's that are used to hold the buried data payload, the header needs to be read and interpreted first. Dependent on the allocation information in the header, the remaining LSB's of the PCM samples that contain the header, may hold buried data payload.

For perceptual control of the header information and the buried data payload, all the LSB's contained in buried_data_frame, except for the syncword, have to pass bit by bit through a de-randomization circuit prior to interpretation. The de-randomization circuit is illustrated in FIG. 4. The following polynomial is applied $$S_n = t_n \oplus t_{n-1} \oplus t_{n-3} \oplus t_{n-14} \oplus t_{n-16}.$$

At the start of every frame all the states $T_i$ are initialized to the binary value 1.

FIG. 4 shows the de-randomization circuit. The blocks T represent shift registers. The additions represent "exclusive or gates". At the start of every frame the shift registers are initialized to the binary value 1. For every new inserted input bit $t_n$, a new output bit $s_n$ is generated.

The bits have to be inserted into the de-randomization circuit in a specific order which is explained in FIG. 5.

FIG. 5 showst The bits in the buried_data_frame need to be inserted into the de-randomization circuit in a specific order. In the figure this is explained by means of a simplified header and buried data payload. Assume that the syncword is only two 2 bits and the remaining header is 6 bits. As illustrated in the figure, the allocation for the first subframe is 3 LSBs for the left channel and 2 bits for the right channel. The synchronization bits labeled "1" and "2" are read first and do not pass through the randomization circuit. The remaining bits are read in the indicated order. This order is "header first" where alternating the left and right channel is read. After that, the bits are read MSB first. All the bits labeled "3 . . . " have to pass through the randomization circuit prior to interpretation.

The first action performed in a receiver is synchronization of the decoder to the CD-DA PCM samples. The syncword is contained in the LSB of the PCM samples representing the left and the right channels. The distance between two consecutive syncwords amounts 2*1152 mono PCM samples or 1152 stereo PCM samples. In order to retrieve the syncword, a bit-stream is generated by successively concatenating the LSB of the PCM sample corresponding to the left channel and the LSB of the PCM sample corresponding to the right channel. The last 16 bits of this bitstream are continuously compared to the syncword. If there is a match for all 16 bits, only then synchronization is achieved.

In another embodiment of a receiver two CRC checks are performed. The error detection methods used are "CRC-4" and "CRC-16" which generator polynomials are $$G(X)=X^4+X^1+1 \quad \text{(CRC-4)}$$

$$G(X)=X^{16}+X^{15}+X^2+1 \quad \text{(CRC-16)}$$

The bits included in the CRC_4 check are the bits after sync_word in the header information. The bits included in the CRC_16 check are the first bit after sync‾word in the header information to the position of the crc16_check. The CRC method is depicted in the CRC-check diagram given in FIG. 6. For CRC-4, the initial state of the shift register is $F. For CRC-16, the initial state of the shift register is $FFFF. All bits included in the CRC check are input to the circuit shown in the FIG. 6. After each bit is input, the shift register is shifted by one bit. After the last shift operation, the outputs bn . . . b0 constitute a word to be compared with the CRC-check word in the stream. If the words are not identical, a transmission error has occurred in the field on which CRC-4 has been applied. To avoid annoying distortions, application of a concealment technique, such as muting of the actual frame or repetition of the previous frame is recommended. FIG. 6 shows a CRC-check diagram. The addition blocks represent "exclusive or" gates.

The following options of embedding the payload into the CD format are available. Firstly, by use of only the buried data channel. No use is made of a physical channel. All header information for extracting the buried data payload, such as synchronization and allocation information, is merged with the buried data. The payload represents an MPEG-2 base and extension frame.

Secondly, by making use of both a buried data channel and a physical channel. The header information is preferably contained in the physical channel. This information is merged with the payload in the physical channel. The payload in the physical channel represents an MPEG-2 base frame. The buried data payload represents an MPEG-2 extension frame.

Thirdly, by making use of only a physical channel. The control information is contained in the physical channel. This information is merged with the payload in the physical channel. The payload represents an MPEG-2 base and extension frame.

In the case a physical limited multi level LML channel is present, it always contains the header. Dependent of whether a second channel is used, as signaled by the content_descriptor, the LML channel will contain either the MPEG-2 base frame alone or additionally the MPEG-2 extension frame. If a buried data channel is used, the start of this frame will be synchronized with the extracted payload from the LML channel.

Also in the case where a physical channel is used, either in combination with a buried data channel or by itself, the framing structure of the MPEG-2 payload remains based on frames of 1152 PCM stereo samples. A frame of 1152 PCM audio samples corresponds to 192-F3 frames. An F3-frame consists of 24 (user) bytes. During disc formatting, the starts of the frames of 1152 stereo PCM samples have been alligned with the F3-frames such that, after incorporation of the decoding delay of the LML data as a result of error correction, the data from the two channels is of the same frame. This is illustrated in FIG. 7.

FIG. 7 shows a frame of 1152 stereo PCM samples corresponds to 192 F3 frames. At the moment the synchronization pulse is detected at the "synchronization point", data at the "frame start point" becomes available from the physical channel. For that specific frame, PCM data starts reading at the "synchronization point".

At any synchronization point, at least 111 F3-frames need to be available in the buffer in order to have the proper amount of physical data available from that point onwards. If this is not the case, decoding can only start at the next synchronization point.

The actual extraction of the physical payload is independent of the processing related to the buried data channel. For each frame of 1152 CD-DA PCM samples, A fixed amount of 290 kbytes of physical payload becomes available. The physical data becomes available byte for byte and is interpreted MSB first. After the header information is read, the data representing the MPEG encrypted MPEG-2 base (+extension) frame is read.

In the case the control information is not contained in the buried data channel, the extraction of the payload can start at the first PCM sample of the left channel. Synchronization and header information is contained in the physical channel. The "alloc" information describes the amount of embedded bits per buried data sub frame. An example is given in FIG. 8. Apart from the payload data, room is reserved for a CRC-16 that operates on the full payload contained in the buried data channel. In the case the buried data payload is zero, no CRC-16 is written.

The buried data payload and additionally, if present, the physical payload within one frame of 1152 CD-DA PCM samples represent one encrypted MPEG-2 audio bitstream that contains 1152 multi-channel audio PCM samples. In the case no physical channel is used, the buried data payload represents a complete encrypted MPEG2 audio stream (base plus extension). In the case a physical channel is used, the buried data payload represents an MPEG-2 extension stream and the physical payload represents the encrypted MPEG-2 base frame stream. The number of bits contained in an encrypted MPEG2 base frame may not exceed the capacity available in the LML channel. The number of bits contained in the encrypted MPEG2 extension frame is variable and is a multiple of 8 bits. The division described above is illustrated in FIG. 9.

In the case a physical channel is used, the encrypted MPEG-2 base frame bits for the corresponding frame are extracted and put in front of buried_data_bits. It should be noted that a record carrier with a physical channel is known from U.S. Pat. No. 5,210,738 and U.S. Pat. No. 5,724,327 (PHN 13.992)

The complete bit-stream (base+extension) is decrypted and subsequently MPEG2 decoded, resulting in 1152 multi-channel PCM audio samples.

For the decoding of MPEG2 audio data reference is made to ISO/IEC 13818-3.

FIG. 10 illustrates transmitter 40 which may include detector 42 for detecting the capacity available in a second frame to insert a first frame and generating a control signal for controlling the data compression of the third digital information signal, the control signal being indicative for the capacity available in the second frame. Transmitter 40 may also include channel-encoder 44 for channel encoding the transmission signal prior to transmitting the transmission.

Whilst the invention is described with reference to preferred embodiments thereof, it is to be understood that these are not limitative examples. Thus various modifications may become apparent to those skilled in the art, without departing from the scope of the invention, as defined by the claims.

The word 'comprising' does not exclude the presence of other elements or steps than those listed in a claim. Any reference signs do not limit the scope of the claims. The invention can be implemented by means of both hardware and software. Several means may be represented by the same item of hardware. Further the invention lies in each and every novel feature or combination of features.

The invention claimed is:

1. Transmitter for transmitting a first and second digital information signal via a transmission medium, said first digital information signal comprising first frames having at least a first synchronization signal and a data portion stored in them, the transmitter comprising:
   input means for receiving the first and second digital information signal;
   processing means for processing the second digital information signal into subsequent second frames, said second frames comprising blocks of information of the second digital information signal;
   signal combination means for inserting a second synchronization signal and at least the data portion of a first frame into a second frame of the second digital information signal so as to obtain a composite frame;
   output means for supplying the composite frames to an output terminal so as to obtain a composite signal to be transmitted; characterized in that said signal combination means are adapted to strip the first synchronization signal from said first frames prior to inserting at lease the data portion of the first frames into the second frames.

2. Transmitter as claimed in claim 1, characterized in that the signal combination means are adapted to insert the data portion of a first frame into a second frame of the second digital information signal by using buried data techniques.

3. Transmitter as claimed in claim 1, characterized in that a second frame represents a portion of the second digital information signal of a predefined duration and a first frame represents a portion of a third digital information signal of a substantially the same duration.

4. Transmitter as claimed in claim 3, characterized in that the first digital information signal is obtained by data compression of the third digital information signal.

5. Transmitter as claimed in claim 4, characterized in that the first digital information signal is in the form of an MPEG encoded signal.

6. Transmitter as claimed in claim 4, characterized in that the transmitter further comprises means for detecting the capacity available in a second frame to insert a first frame and generating a control signal for controlling the data compression of the third digital information signal, said control signal being indicative for the capacity available in said second frame.

7. Transmitter as claimed in claim 1, characterized in that the second digital information signal comprises at least one PCM signal.

8. Transmitter as claimed in claim 1, the transmitter being in the form of an apparatus for recording the digital information signal on a record carrier.

9. Transmitter as claimed in claim 1, characterized in that the transmitter further comprises channel-encoding means for channel encoding the transmission signal prior to transmission.

10. Transmitter as claimed in claim 1, wherein:
    the signal combination mean are adapted to insert the data portion of a first frame into a second frame of the second digital information signal by using buried data techniques;
    a second frame represents a portion of the second digital information signal of a predefined duration and a first frame represents a portion of a third digital information signal of a substantially the same duration;
    the first digital information signal is obtained by data compression of the third digital information signal;
    the first digital information signal is in the form of an MPEG encoded signal;
    the transmitter further comprises means for detecting the capacity available in a second frame to insert a first frame and generating a control signal for controlling the data compression of the third digital information signal, said control signal being indicative for the capacity available in said second frame;
    the second digital information signal comprises at least one PCM signal;
    the transmitter being in the form of an apparatus for recording the digital information signal on a record carrier; and
    the transmitter further comprises channel-encoding means for channel encoding the transmission signal prior to transmission.

11. Method of transmitting a first and second digital information signal via a transmission medium, said first digital information signal comprising first frames having at least a first synchronization signal and a data portion stored in them, the method comprising the steps:
    receiving the first and second digital intonation signal;
    processing the second digital information signal into subsequent second frames, said second frames comprising blocks of information of the second digital information signal;

inserting a second synchronization signal and at least the data portion of a first frame into a second frame of the second digital information signal so as to obtain a composite frame;

supplying the composite frames to an output terminal so as to obtain a composite signal to be transmitted; characterized in that method further comprises the step stripping the first synchronization signal from said first frames prior to inserting at least the data portion of said first frames into the second frames.

12. Method as claimed in claim 11, characterized in that the at least the data portion of a first frame is inserted into a second frame at the second digital information signal by using buried data techniques.

13. Method as claimed in claim 11, characterized in that a second frame represents a portion of the second digital information signal of a predefined duration and a first frame represents a portion of a third digital information signal of a substantially the sane duration.

14. Method as claimed in claim 13, characterized in that the first digital information signal is obtained by data_compression of the third digital information signal.

15. Method as claimed in claim 14, characterized in that the first digital information signal is in the form of an MPEG encoded signal.

16. Method as claimed in claim 11, wherein:
the at least the data portion of a first frame is inserted into a second frame of the second digital information signal by using buried data techniques;
a second frame represents a portion of the second digital information signal of a predefined duration and a first frame represents a portion of a third digital information signal of a substantially the sante duration;
the first digital information signal is obtained by data compression of the third digital information signal; and
the first digital information signal is in the form of an MPEG encoded signal.

17. Transmission medium in the form of a record carrier carrying a composite signal comprising portions of a first and a second digital information signal, said composite signal being a sequence of composite frames, a composite frame comprises a second synchronization signal and a data portion of a first frame of the first digital information signal, said first frame comprises a first synchronization signal and a data portion, said composite frame being obtained by inserting the second synchronization signal and at least the data portion of the first digital information signal into a second frame of the second digital information signal, a second frame being obtained by processing the second digital information signal into subsequent second frames, said second frames comprising blocks of information of the second digital information signal, characterized in that prior to inserting at least the data portion of a first frame the first synchronization signal is stripped from said first frame.

18. Transmission medium as claimed in claim 17, characterized in that at least the data portion of a first frame is inserted in a second frame by using buried data techniques.

19. Transmission medium as claimed in claim 17, characterized in that a second frame represents a portion of the second digital information signal of a predefined duration and a first frame represents a portion of a third digital information signal of substantially the same duration.

20. Transmission medium as claimed in claim 19, characterized in that the first digital information signal is obtained by data compression of the third digital information signal.

21. Transmission medium as claimed in claim 17, wherein the record carrier is of the optical or magnetical recording type.

22. The transmission medium of claim 17, wherein:
at least the data portion of a first frame is inserted in a second frame by using buried data techniques;
a second frame represents a portion of the second digital information signal of a predefined duration and a first frame represents a portion of a third digital information signal of substantially the same duration;
the first digital information signal is obtained by data compression of the third digital information signal; and
the record carrier is of the optical or magnetical recording type.

* * * * *